May 30, 1961  I. S. BJORKLUND  2,986,278
CENTRIFUGAL SEPARATORS
Filed May 26, 1958

INVENTOR:
IVAN S. BJORKLUND
BY: *Oswald W. Milmore*
HIS ATTORNEY

United States Patent Office 2,986,278
Patented May 30, 1961

2,986,278
CENTRIFUGAL SEPARATORS

Ivan S. Bjorklund, Menlo Park, Calif., assignor to Shell Oil Company, New York, N.Y., a corporation of Delaware Filed May 26, 1958, Ser. No. 737,729
7 Claims. (Cl. 209—144)

This invention relates to centrifugal separators of the type employing a plurality of tubular separators mounted within a single casing for parallel-flow operation, e.g., for removing catalyst particles from hydrocarbon vapors or from combustion products, or for separating dust from air.

It is known to mount a number of small-diameter tubular separators within a casing having an inlet chamber from which the particle-ladened gas is supplied to the several separators and a clean-gas outlet chamber into which the separators discharge, the separators having outlets through which the separated particles are discharged together with a minor fraction, e.g., 1–10% of the gas, herein called blow-down gas. For attaining the greatest effectiveness it is important that the several separators operate without mutual interference and under substantially like conditions; more particularly, it is important that the same quantities of blow-down gas are discharged. Because of usual variations in the separators caused by manufacturing tolerances, the pressures within the tubes immediately adjoining the particle- and gas-outlets are not the same, with the result that there is a tendency for large variations in the quantities of blow-down gas that would flow from the several separators if they discharged immediately into a common collecting chamber. This tendency has heretofore required the use of a separate blow-down pipe for each separator, which conducts the particles and gas from the several separators into a common collecting chamber and promotes uniform flows by imposing flow resistance. However, such blow-down pipes and common collecting chambers are costly both as to installation and capital costs and present difficulties in repairing and cleaning.

Further, it is desirable to mount the tubular centrifugal separators in closely adjacent relations to conserve space, and to locate each particle- and gas-outlet at the side of the centrifugation tube, e.g., in the form of a circumferential slit near the closed end, i.e. immediately adjacent or spaced a small distance from the end. Such a mounting is difficult to achieve when separate blow-down pipes are used because of the crowding of parts; on the other hand, the simple lateral discharge from such slits into a common collecting chamber has not heretofore been feasible due to mutual interference of the discharge streams. Thus, the particulate and/or the gaseous material discharged from one separator tube may hinder the free discharge from an adjoining tube and may even be projected into the slit of the adjoining tube, particularly when the adjoining tubes do not operate under identical conditions, a situation which is likely due to imperfections in manufacture, as noted above, and/or due to differences in aerodynamic resistances of the paths through the inlet chambers to the respective separator inlets.

Decoupling can be attained by surrounding the discharge slit in each separator tube by an annular skirt which defines an open-ended passage for the flow of solid particles and blow-down gas into the collecting chamber. A difficulty with such an expedient is that only moderate pressure drop—and correspondingly moderate decoupling—is obtained unless the passages are made extremely narrow. Such narrow passages are easily clogged and it is difficult to insure the correct dimensions thereof.

It is, therefore, an object of the invention to provide an improved centrifugal separator of the type employing a plurality of small tubular centrifugal separators, wherein the separated particles and blow-down gas are discharged directly into a common collecting chamber, having an improved flow-restrictive element which insures a sufficient pressure drop to the blow-down gas such that the several separators can be operated effectively without mutual interference.

In summary, the several separator tubes, having circumferential slits through which the particles and blow-down gas are discharged, are provided with jackets which surround the tubes opposite the slits and define receiving chambers for the particles and gas, and the receiving chambers communicate directly with the common collecting chamber through decoupling devices which include short, narrow, flow-restrictive tubes.

The invention will be further described with reference to the accompanying drawing forming a part of this specification and showing, by way of illustration, one preferred embodiment, wherein.

Figure 2:
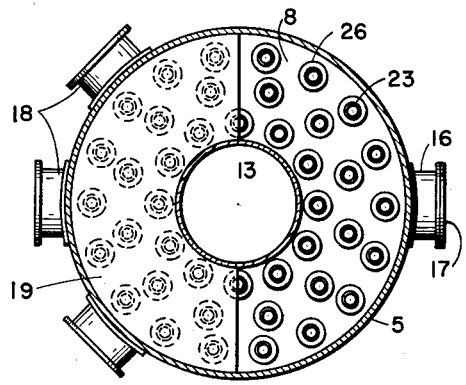
Figure 2 is a transverse sectional view, taken on the line 2—2 of Figure 1.

Referring to the drawings in detail, the apparatus comprises a casing 5 having an upper cylindrical section and a frusto-conical bottom section 6 which is connected to a smaller base section 7. The casing contains upper and lower transverse, air-sealed partitions 8 and 9 which divide the casing into an upper clean-gas outlet chamber 10, an intermediate inlet chamber 11 and a lower collecting chamber 12. An inlet duct 13 extends downwardly through the top of the casing and through the partition 8 at the central axis and is provided at the bottom with a distributor bottom 14 which forms a sump below the bottom of the inlet chamber 11. The duct 13 has side openings preferably covered by screens 15 for the passage of the inlet gas, burdened with solids, from the duct into the inlet chamber. Coarse particles are prevented by these screens from entering the inlet chamber and fall into the sump. The casing is further provided at the top with a manway 16, closed by a closure plate 17, and one or more outlet nozzles 18 through which clean gas is discharged from the chamber 10. A sector-shaped baffle plate 19, extending over 180°, is mounted just beneath the outlet nozzles 18 to promote uniform pressure over the area of the partition 8 and to insure equal pressures at the discharge nozzles 18. The base section 7 has an outlet nozzle 20 through which separated particles and blow-down gas are removed from the collecting chamber.

Figure 3:
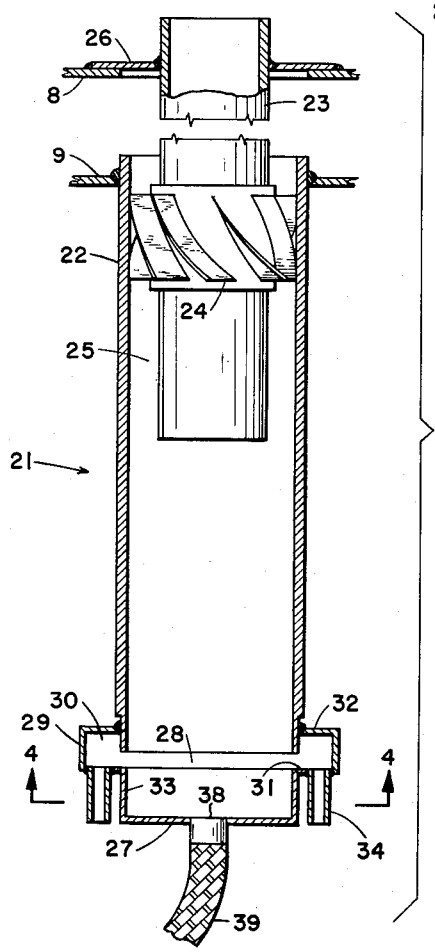
Figure 3 is an enlarged vertical sectional view through one of the tubular centrifugal separators.
Figure 1:
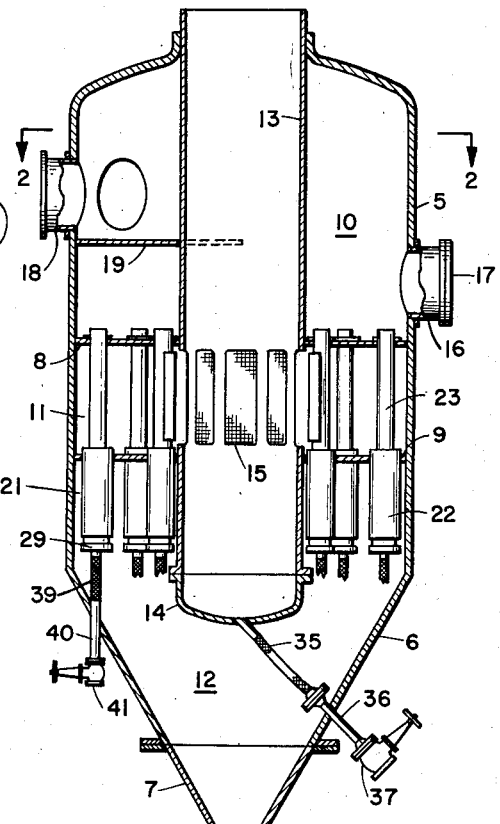
Figure 1 is a vertical sectional view through the complete apparatus.
Figure 4:
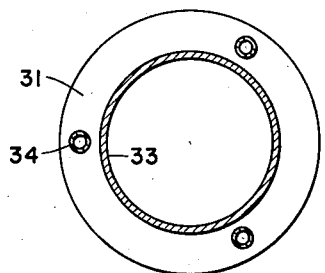
Figure 4 is a transverse sectional view, taken on the line 4—4 of Figure 3.

A plurality, e.g., forty-two, tubular centrifugal separators 21 are mounted with their axes vertical in closely adjacent relation about the inlet duct 13. As shown more particularly in Figures 3 and 4, each separator includes an outer tube 22 which extends downwards in sealed relation through a hole in the partition 9 and has the lower part thereof hermetically embouchured within the collecting chamber 12, e.g., by weldments to the partition 9. The separator further includes an inner, clean-gas tube 23 of lesser diameter than and concentrically within the outer tube and extending upwards through a hole in the partition 8, and swirl vanes 24 welded to the tube 23 and situated in the annular space between the inner and outer tubes, which impart a swirling motion to gas which flows downward into the annular centrifugation space 25 between the tubes. Each tube 23 has an annular support plate 26 welded thereto and resting on the partition 8, the swirl vanes 24 being slidable within the outer tube. During assembly the several tubes 22 are first welded to the partition 9 and the inner tubes 23 are thereafter slid into the holes in the partition 8, with their inner ends within the tubes 22; the plates 26 are then welded to the partition 8 to effect hermetic seals.

Each tube is terminally obstructed by a bottom closure 27 and has a circumferential slit 28 for the discharge of particles and blow-down gas. The slit 28 is near the closure 27, e.g., immediately adjacent thereto or preferably spaced above it by a distance up to one diameter, as shown. The inner (bottom) end of the tube 23 is above the level of the slit. A jacket 29 surrounds the slit to define an annular receiving chamber 30 which is closed at the bottom by a floor plate 31 and at the top by an annular top plate 32. The lowermost part 33 of the tube, situated below the slit, is supported from the floor plate 31. The floor plate 31 carries a plurality of short, narrow flow-restrictive discharge tubes 34 which are fitted at corresponding openings in the plate and communicate directly and without obstruction with the collecting chamber 12. These discharge tubes preferably have diameters of from one twenty-fifth to one fifth of the diameter of the outer separator tube 22 and lengths of one to twenty times the diameter of the discharge tubes 34. The length of the tubes is advantageously at least one diameter to insure effective drop.

The bottom 14 may be provided with a central opening to which is fitted a drain conduit 35 which is advantageously flexible and extends downwards out of the casing via a rigid coupling extension tube 36, the latter having a shut-off valve 37. Similarly, each of the bottom closures 27 may have a central hole 38 to which is connected a flexible drain conduit 39 extending downwards out of the casing via a rigid coupling extension tube 40 and provided with a shut-off valve 41.

In operation, the feed gas, containing suspended particles, is admitted through the inlet duct 13 and flows radially out through the screens 15 into the inlet chamber 11, together with particles small enough to pass the screen. The gas thence enters the several tubes 22, assuming a swirling motion upon passing the vanes 24, whereby the particles are hurled by centrifugal force against the wall of the outer tube, both within the annular passage 25 and below the bottom of the inner tube 23. The central core of clean gas is discharged through the inner tube into the outlet chamber 10, from which it is discharged via the outlet nozzles 18. The separated particles descend to the bottoms of the tubes and are discharged together with blow-down gas through the slits 28 into the annular receiving chambers 30 and emerge from these chambers through the flow-restrictive discharge tubes 34 downwards into the collecting chamber 12. The tubes 34 impose significant pressure drop on the blow-down gas, which increases with the rate of flow. This exerts a regulating action to insure more or less uniform exit of blow-down gas from the several separator tubes despite differences among the fluid-dynamic characteristics of the separators. Further, by imposing a flow resistance, the narrow tubes 34 effectively decouple the several separators fluid-dynamically, to prevent disturbances in the pressure due to discharge from any tube from interference with the independent operation of the other tubes. An illustrative set of dimensions is given in the example below.

The pressure prevailing in the collecting chamber 12 is usually only slightly less than that in the insides of the tubes 22 at the discharge slits 28, typically between 0.1 and 1.0 lb. per sq. in., and it is a special feature of this invention that effective decoupling can be achieved with reasonably low rates of blow-down gas flow while using a simple construction. This result would not be attained if flow restrictive tubes significantly shorter than one tube diameter or if simple orifice restrictions were used.

It is evident that the constructions, in obviating the need for long blow-down pipes, permits the close spacing of the separator tubes and reduces piping costs. The discharge tubes 34 have the advantage over narrow slots or flow-restrictive orifices dimensioned to achieve the same pressure drop that they are less prone to becoming clogged. Also, by providing a plurality of such tubes for each receiving chamber the temporary obstruction of one or two of such tubes will not result in complete cessation of operation of the associated tube.

When the apparatus is started up while cold and the feed gas contains condensible matter, the valves 37 and 41 are opened during the start-up period to drain off condensed liquid, together with solids, which would otherwise tend to clog the apparatus. After the apparatus has been heated these valves are closed. Solid particles which are too large to pass the screens 15 are also discharged from time to time through the drain conduit 35. It should be noted that the drain conduits 39 are especially useful when the discharge slits 28 are situated in spaced relation above the bottom closures 27 and may be omitted when these slits adjoin the closure.

*Example*

A separator tube constructed as shown in the drawing had the following dimensions:

Inside diameter of tube 22 _____in__ 7.5
Width of receiving chamber 30 _____in__ ¾
Number of flow-restrictive tubes 34 _____ 3
Inside diameter of tubes 34 _____in__ 35/64
Length of tubes 34 _____in__ 2¾

The separator tube was operated at a pressure of 5 lbs. per sq. in. gauge and a gas inlet flow of 1000 cubic ft. per min., measured at the said pressure and room temperature. The gas bleed rate was varied by altering the back pressure in the collecting chamber.

A comparative run used a separator tube having the same dimensions but differing from the construction according to the invention in that the annular floor plate 31 and tubes 34 were omitted, thereby providing an annular discharge passage. The jacket 29 extended vertically through a distance of about 3 in. and was spaced ⅛ in. from the tube 22, to define an annular discharge passage. A passage ⅛ in. in width is approximately the narrowest that is practicable in view of the danger of clogging. The decoupling effects are compared in the following table:

| Blow-down Flow Rate, cu. ft./min. | Decoupling Pressure Drop, lbs. per sq. in. | |
| --- | --- | --- |
| | With Flow-Restrictive Tubes | With Open Annular Passage |
| 20 | 0.083 | 0.027 |
| 35 | 0.260 | 0.066 |
| 50 | 0.490 | 0.111 |

The baffle plate 19 promotes equal flow of gas among the several separator tubes and also among the several outlet nozzles 18, although these are all located on one side of the casing.

I claim as my invention:

1. Apparatus for cleaning gas comprising: wall means defining substantially air-sealed, separated chambers including a gas inlet chamber, a clean-gas outlet chamber, and a particle collecting chamber; means for admitting a gas burdened with particles into said inlet chamber;

separate outlet means for said outlet and collecting chambers, respectively; and a plurality of centrifugal separators disposed closely adjacent to one another, each said separator including a separator tube defining a centrifugation space and having a terminally obstructed end situated substantially at said collecting chamber, inlet means in communication with the said inlet chamber for admitting gas therefrom with a swirling motion into said centrifugation space, means for discharging clean gas from said centrifugation chamber into said outlet chamber, and outlet means for discharging particles and bleed gas from said centrifugation space including a circumferential slit substantially at the said terminally obstructed end and a decoupling device connected to receive the total flow of particles and bleed gas from said slit and discharging said flow into said collecting chamber, said decoupling device including at least one flow-restrictive discharge tube for said flow having the outlet thereof within the said collecting chamber in the immediate vicinity of the said end of the separator tube, each said discharge tube having a diameter between about one twenty-fifth and one-fifth of the separator tube diameter and a length between about one and twenty times the diameter of the discharge tube itself to impose a pressure drop on said flow and thereby decouple each separator fluid-dynamically from the others.

2. Apparatus as defined in claim 1 wherein the said separator tubes are disposed in parallel relation and the flow-restrictive discharge tubes of the several separators have their outlets directed along parallel axes.

3. Apparatus as defined in claim 1 wherein the parts of the separator tubes having the said slits are situated within the particle collecting chamber, said outlet means includes, for each separator, a closed jacket surrounding the separator tube opposite the slit therein and defining a closed receiving chamber, and said decoupling device includes a plurality of parallel, narrow discharge tubes distributed circumferentially about the separator tube and having their intake ends in communication with said receiving chamber.

4. Apparatus for cleaning a gas comprising: wall means defining substantially air-sealed, separated chambers including a gas inlet chamber, a clean-gas outlet chamber, and a particle collecting chamber; means for admitting a gas burdened with particles into said inlet chamber; separate outlet means for said outlet and collecting chambers, respectively; and a plurality of centrifugal separators disposed parallel and closely adjacent to one another, each said separator including a separator tube defining a centrifugation space and having a terminally obstructed end situated within said collecting chamber, inlet means in communication with the said inlet chamber for admitting gas therefrom with a swirling motion into said centrifugation space, means for discharging clean gas from said centrifugation chamber into said outlet chamber, and outlet means for discharging particles and bleed gas from said centrifugation space including a circumferential slit substantially at the said terminally obstructed end and a decoupling device connected to receive the total flow of particles and bleed gas from said slit and discharging said flow into said collecting chamber, said decoupling device including at least one flow-restrictive discharge tube for said flow situated within said collecting chamber in the immediate vicinity of the said end of the separator tube with a diameter between one-fifth and one twenty-fifth of the separator tube diameter and a length between about one and twenty times the diameter of the discharge tube itself, said discharge tube diameter being such as to impose a pressure drop of between 0.1 and 1.0 lb. per sq. inch on said flow and thereby to decouple each separator fluid-dynamically from the others.

5. A tubular separator suitable for operation together with other like tubes connected to common gas inlet, gas discharge and particle collecting chamber when closely juxtaposed thereto, said tube including: an outer vortex tube having a closure at one end and a circumferential discharge slit near to said closure for the discharge of particles and bleed gas; a clean-gas discharge tube at least partly within said vortex tube and defining between itself and said vortex tube an annular chamber which is open toward said one end of the vortex tube, the inner end of the discharge tube being located short of said discharge slit; means for admitting a gas, burdened with particles, with a swirling motion into said annular chamber; a closed, annular jacket surrounding said vortex tube at the discharge slit and enclosing a receiving chamber for receiving the total flow of particles and bleed gas from the slit; and decoupling means for discharging said total flow from the receiving chamber including at least one short, narrow, flow-restrictive discharge tube in flow-receiving communication with said receiving chamber having a diameter between about one twenty-fifth and one-fifth of the vortex tube diameter and a length between about one and twenty times the diameter of the discharge tube itself, for imposing a pressure drop on said flow to decouple the separator fluid-dynamically from other tubes.

6. A separator according to claim 5 wherein said decoupling device comprises a plurality of flow-restrictive discharge tubes distributed circumferentially about the vortex tube and having their outlets directed along substantially parallel axes.

7. A separator according to claim 6 wherein the said flow-restrictive discharge tubes are straight tubes the axes of which are parallel to the axis of the vortex tube and have diameters such as to impose a pressure drop of between 0.1 and 1.0 lb. per square inch on said flow.

References Cited in the file of this patent

UNITED STATES PATENTS

| | | |
|---|---|---|
| 2,346,005 | Bryson | Apr. 4, 1944 |
| 2,378,632 | Hooker | June 19, 1945 |
| 2,773,598 | Castellani | Dec. 11, 1956 |
| 2,812,828 | Yellott | Nov. 12, 1957 |
| 2,941,621 | Dygert | June 21, 1960 |

FOREIGN PATENTS

| | | |
|---|---|---|
| 680,297 | Great Britain | Oct. 1, 1952 |